(12) United States Patent
Wern

(10) Patent No.: US 11,607,757 B2
(45) Date of Patent: Mar. 21, 2023

(54) MACHINING SYSTEM, APPARATUS AND METHOD

(71) Applicant: ENGINEERED ABRASIVES, INC., Alsip, IL (US)

(72) Inventor: Michael J. Wern, Alsip, IL (US)

(73) Assignee: Engineered Abrasives, Inc., Alsip, IL (US)

( * ) Notice: Subject to any disclaimer, the term of this patent is extended or adjusted under 35 U.S.C. 154(b) by 921 days.

(21) Appl. No.: 16/025,402

(22) Filed: Jul. 2, 2018

(65) Prior Publication Data

US 2019/0030660 A1 Jan. 31, 2019

Related U.S. Application Data

(63) Continuation of application No. 15/157,816, filed on May 18, 2016, now Pat. No. 10,086,483.

(Continued)

(51) Int. Cl.
*B23P 15/14* (2006.01)
*B24C 1/08* (2006.01)
(Continued)

(52) U.S. Cl.
CPC .............. *B23P 15/14* (2013.01); *B23F 19/00* (2013.01); *B23F 19/10* (2013.01); *B24B 31/02* (2013.01);
(Continued)

(58) Field of Classification Search
CPC ..... B24B 31/06; B24B 31/062; B24B 31/064; B24B 31/067; B24B 31/073; B24B 31/003; B24B 31/027
See application file for complete search history.

(56) References Cited

U.S. PATENT DOCUMENTS 3,523,834 A * 8/1970 Hewins .................... B23H 5/06
148/254
3,570,184 A * 3/1971 Ferrara ................... B24B 31/02
451/113

(Continued)

OTHER PUBLICATIONS

Metal Finishing News, "Why is Surface Finishing needed on certain shot peened components," vol. 2—(Aug. 2001).

*Primary Examiner* — Joel D Crandall
(74) *Attorney, Agent, or Firm* — BakerHostetler

(57) ABSTRACT

A method and apparatus for processing a metallic workpiece with defined edges (e.g., a gear) comprises media blasting of the workpiece by directing a first media against exposed surfaces on the workpiece to increase the root strength of the gear, the blasting causing the defined edges to be radiused or mushroomed, ceasing the media blasting, loading the workpiece into a finishing apparatus, and subjecting the workpiece to a finishing process with a second media, the exposed surfaces on the workpiece being subjected to the finishing process to reduce the radiused edges on the workpiece created from the media blasting. The process of moving the workpiece to the spindle-finishing apparatus from the media blasting may be performed automatically by a machine. Once the workpiece has been subjected to the finishing process with the second media, it may be removed from the spindle-finishing machine, washed, and rinsed with rust inhibitor whereby wear properties of the workpiece are enhanced.

17 Claims, 9 Drawing Sheets

Related U.S. Application Data

(60) Provisional application No. 62/186,042, filed on Jun. 29, 2015.

(51) Int. Cl.

| | | |
|---|---|---|
| *B24C 1/10* | (2006.01) | |
| *B24C 11/00* | (2006.01) | |
| *B24B 31/02* | (2006.01) | |
| *C21D 7/06* | (2006.01) | |
| *C21D 9/32* | (2006.01) | |
| *C22F 1/00* | (2006.01) | |
| *B24B 39/00* | (2006.01) | |
| *B23F 19/10* | (2006.01) | |
| *B23F 19/00* | (2006.01) | |

(52) U.S. Cl.
CPC ............ *B24B 39/006* (2013.01); *B24C 1/083* (2013.01); *B24C 1/10* (2013.01); *B24C 11/00* (2013.01); *C21D 7/06* (2013.01); *C21D 9/32* (2013.01); *C22F 1/00* (2013.01)

(56) References Cited

U.S. PATENT DOCUMENTS

| | | | |
|---|---|---|---|
| 3,599,374 A * | 8/1971 | Porter | B24B 31/0224 451/113 |
| 3,623,278 A * | 11/1971 | Schwartz | B24B 31/104 451/32 |
| 4,205,487 A * | 6/1980 | Anderson | B24B 31/003 279/43 |
| 4,630,401 A | 12/1986 | McNeil | |
| 4,991,360 A | 2/1991 | Despain | |
| 5,226,969 A | 7/1993 | Watanabe et al. | |
| 5,272,897 A | 12/1993 | Wern | |
| 5,911,780 A | 6/1999 | Hamasaka et al. | |
| 6,238,268 B1 | 5/2001 | Wern | |
| 6,261,154 B1 | 7/2001 | McEneny | |
| 6,315,646 B1 * | 11/2001 | Hoyashita | B23F 17/00 29/90.7 |
| 7,144,302 B2 | 12/2006 | Bolz et al. | |
| 7,641,744 B2 | 1/2010 | Winkelmann | |
| 8,062,094 B2 | 11/2011 | Cisek et al. | |
| 8,109,854 B2 | 2/2012 | Michaud et al. | |
| 8,171,637 B2 | 5/2012 | Michaud et al. | |
| 8,801,498 B2 | 8/2014 | Hammond et al. | |
| 8,858,734 B2 | 10/2014 | Michaud et al. | |
| 8,920,215 B2 | 12/2014 | Redaelli | |
| 9,017,142 B2 | 4/2015 | Van Kleef et al. | |
| 9,550,272 B2 | 1/2017 | Sroka | |
| 10,086,483 B2 * | 10/2018 | Wern | B23F 19/00 |
| 2002/0004356 A1 | 1/2002 | Wern | |
| 2004/0242134 A1 * | 12/2004 | Lee | B24B 31/003 451/113 |
| 2005/0186889 A1 * | 8/2005 | McNeil | B24B 31/003 451/36 |
| 2005/0255797 A1 | 11/2005 | Kawasaki et al. | |
| 2007/0238397 A1 | 10/2007 | Dyer | |
| 2010/0088897 A1 | 4/2010 | Habibvand | |
| 2010/0288398 A1 | 11/2010 | Sroka et al. | |
| 2010/0300229 A1 | 12/2010 | Sato et al. | |
| 2011/0017006 A1 * | 1/2011 | Wern | C21D 9/32 74/457 |
| 2011/0117820 A1 * | 5/2011 | Sroka | B23Q 3/1546 451/36 |

* cited by examiner

MACHINING SYSTEM, APPARATUS AND METHOD

CROSS REFERENCE TO RELATED APPLICATIONS

This application is a Divisional of co-pending U.S. patent application Ser. No. 15/157,816, filed May 18, 2016, which claims the benefit of priority under 35 U.S.C. § 119(e) to U.S. Provisional Patent Application No. 62/186,042, filed Jun. 29, 2015. The disclosures set forth in the referenced applications are incorporated herein by reference in their entirety.

BACKGROUND OF THE INVENTION

This invention relates generally to a method for media blasting and finishing a gear or other workpiece or part. The powered part hold-down apparatus of U.S. Pat. No. 5,272,897 may be used for the peening step(s) of the present disclosure, and the disclosure of the U.S. Pat. No. 5,272,897 patent is hereby incorporated in its entirety by this reference. Elements of other known methods of media blasting and finishing, such as the peen finishing method and apparatus of U.S. Pat. No. 8,453,305, may be used for the present disclosure, and the disclosure of the U.S. Pat. No. 8,453,305 patent is hereby incorporated in its entirety by this reference.

Media blasting or peening is used to increase the fatigue strength of a gear, workpiece or part. Gears, such as those utilized in automobile transmissions are media blasted to increase their surface durability and ensure that they are suitable for performing their intended functions. As an example, media blasting with steel peening may be used for strengthening the root radius of the teeth of a geared workpiece. The media blasting steps of the present invention includes one or more steps disclosed in U.S. Pat. No. 6,612,909 and the disclosure of the U.S. Pat. No. 6,612,909 patent is hereby incorporated in its entirety by reference.

When media blasting a workpiece, such as a gear, the workpiece is placed in a closed chamber and the blasting system is actuated, whereby media are mixed with air. After mixing of the media and air, a stream of the air/media mixture is directed against the workpiece, often through increased or high-speed application. This process is referred to as peening.

A variety of materials/media may be used for the workpiece, depending on the ultimate application or outcome desired by the workpiece. In automotive applications, it is often desires to increase the strength or hardness of the media in order to have more favorable KSI. In the present disclosure, toughness is discussed in terms of "KSI" (kilopound[-force] per square inch) or 1000 psi. KSI is often used in materials science, civil and mechanical engineering to specify stress and Young's modulus. A higher KSI is favorable for materials that will be under larger compressive stresses.

When a workpiece, in particular a workpiece made of media that has a high KSI, is peened, the peening material is blasted against the surface of the workpiece, removing and modifying the microscopic landscape of the surface. When a workpiece includes sharp or distinct edges, such as the tip of a gear tooth, those edges or tips may be unintentionally radiused from the blasting of the peening material, such that a mushroom effect occurs on the edge or tip of the gear tooth. This mushroom effect may alter the operation or functionality of the workpiece. Even if the mushroom effect does not alter the operation or functionality of the workpiece, it may create unwanted noise when the workpiece engages with other components during operation. It is understood that the higher the KSI of a workpiece, the more the tips may be radiused during a peening process.

OBJECTS AND SUMMARY OF THE INVENTION

An object of the present invention is to remove or reduce the effect of radiused tips that may be created when a workpiece is subjected to a peening process by subjecting the workpiece to a spindle-finishing process after it has been peened. For a workpiece with gear teeth or other similar sharp edges, the peening process may be applied to strengthen the root radius and tooth face of gears by peening the gears and then optionally subjected to a vibratory finishing process. The peening step(s) toughen the gears and provide roughness to the gear surfaces. The spindle-finishing process after peening removes or reduces the mushrooming effect on the radiused tips that occurs during the peening process.

An object of the present invention is to provide a method of processing a metallic workpiece with defined edges (e.g., a gear) comprising media blasting of the workpiece by directing a first media (e.g., cut wire) against exposed surfaces on the workpiece to increase the root strength of the gear, ceasing the media blasting, loading the workpiece into a spindle-finishing apparatus, and subjecting the workpiece to a finishing process with a second media (e.g., metal, plastic, synthetic, glass, ceramic or FINE STEEL®), the exposed surfaces on the workpiece being subjected to the finishing process to reduce radiused tips on the workpiece created from the media blasting. In illustrative embodiments, the process of moving the workpiece to the spindle-finishing apparatus from the media blasting may be performed automatically by a machine. Once the workpiece has been subjected to the finishing process (spindle machine or vibe machine) with the second media, it may be removed from the spindle-finishing machine, washed, and rinsed with rust inhibitor whereby wear properties of the workpiece are enhanced. Media blasting and subsequent finishing of gears according to the present invention accomplishes an important object which is to reduce or eliminate undesired radiused tips of the gears.

Another object of the present invention is to provide a workpiece (e.g., a gear, shaft or other metal parts) with a higher KSI strength that has been media blasted/peened such that radiused tips exist on one or more tips or edges of the workpiece, and subsequently processing the workpiece with a fine finishing process (e.g., spindle-finishing or vibe-finishing process) to provide a reduction or elimination of the radiused tips of the workpiece as compared to before the fine finishing process.

BRIEF DESCRIPTION OF THE DRAWINGS

The present invention will now be described, by way of example, with reference to the accompanying drawings in which.

DETAILED DESCRIPTION OF PREFERRED EMBODIMENTS

Figure 3:
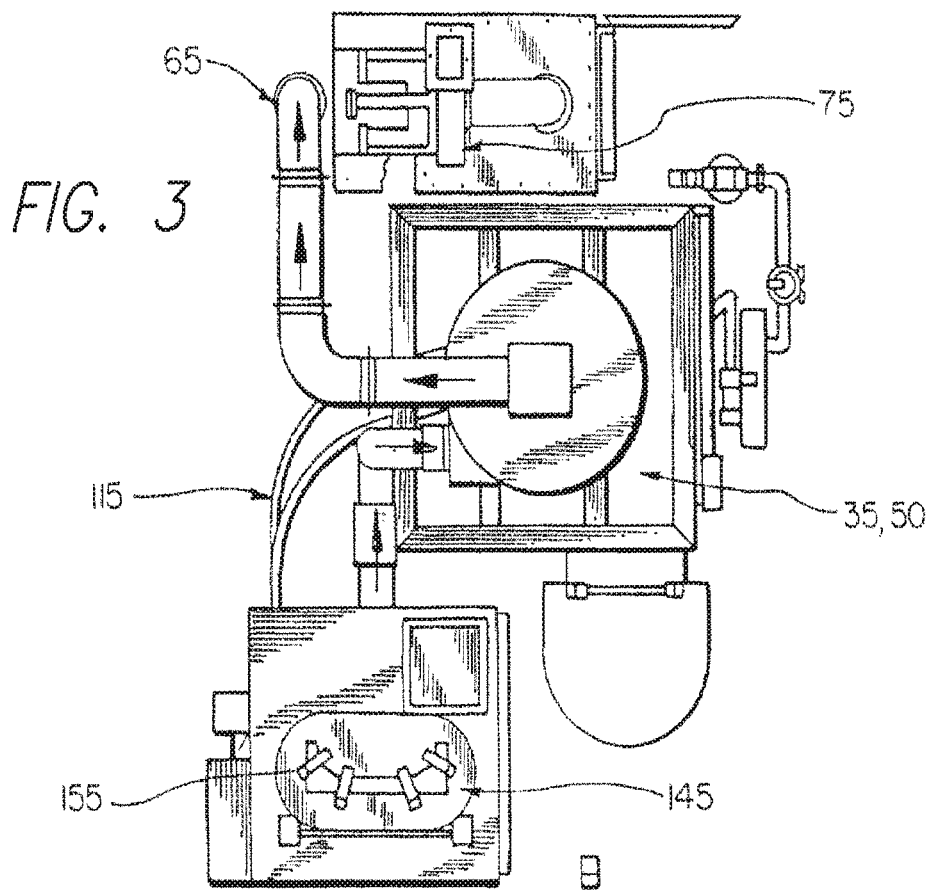
FIG. 3 is a top plan view of the media blasting apparatus of FIG. 1.
Figure 4:
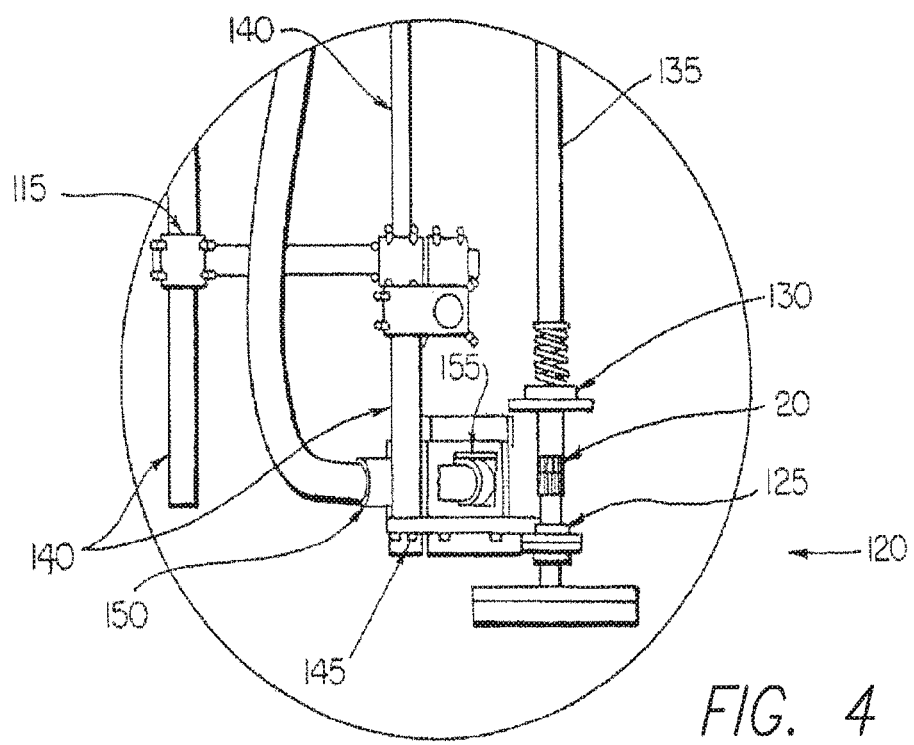
FIG. 4 is an enlarged, partial fragmentary, side elevational view of a blast station of a first exemplary media blasting apparatus for treating a workpiece according to the invention.
Figure 5:
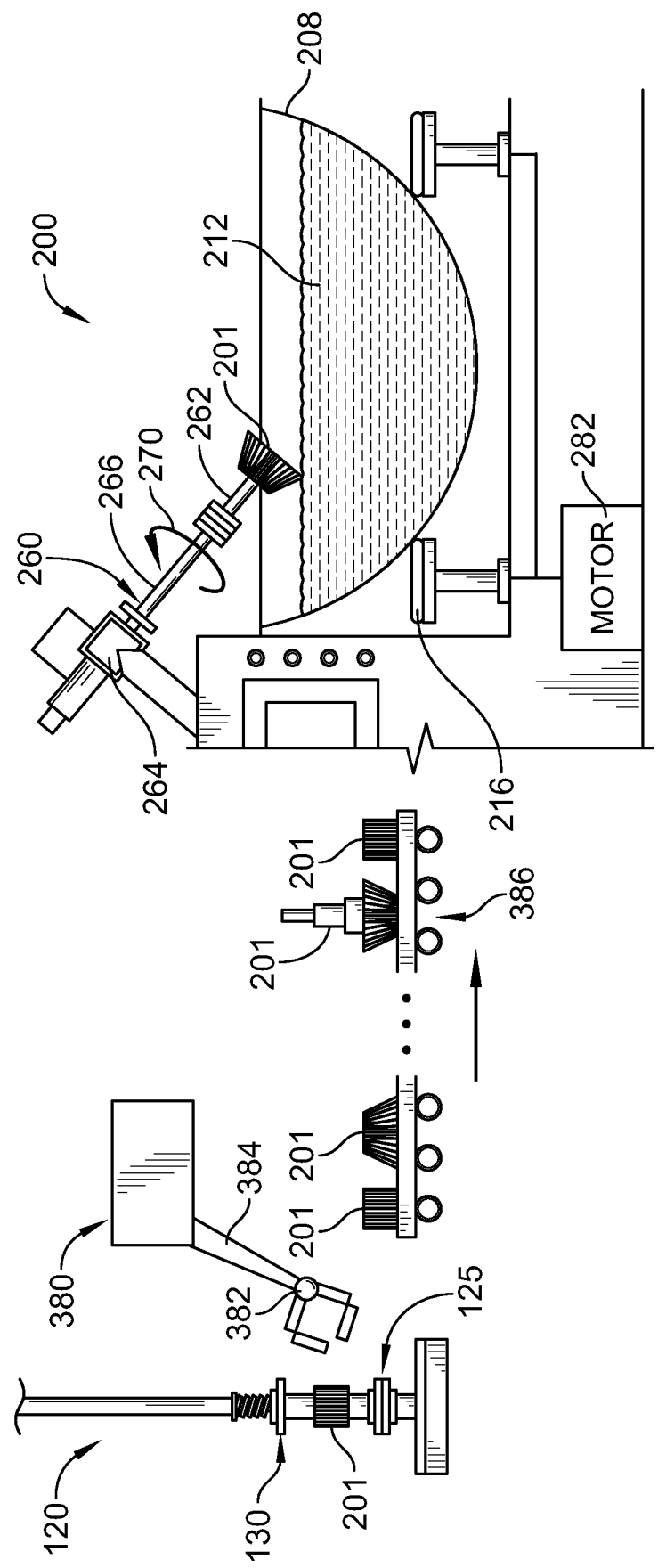
FIG. 5 is schematic of a first media blasting apparatus and a second spindle finishing apparatus, and an exemplary transportation process between a first media blasting apparatus and the second spindle-finishing apparatus.
Figure 6:
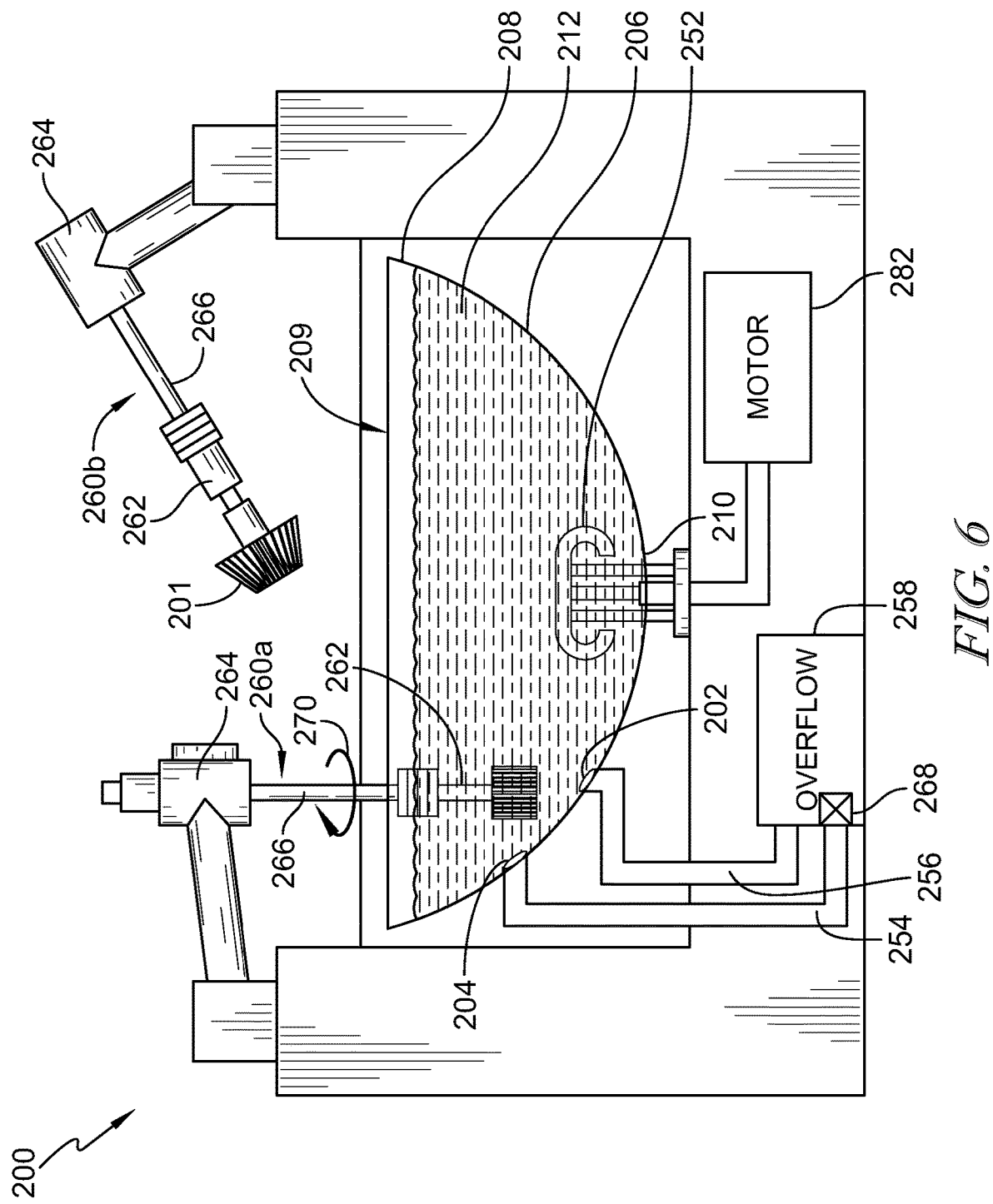
FIG. 6 is aside elevation view of an exemplary spindle-finishing apparatus.
Figure 8A:
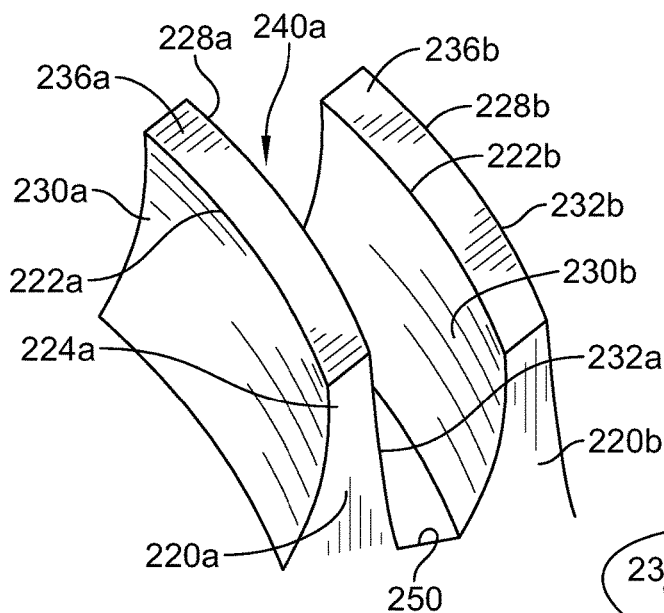
FIGS. 8A-8C are detailed view of the gear teeth of the workpiece of FIG. 7 before the workpiece is subjected to a first exemplary media blasting, after it is subjected to a first exemplary media blasting but before it is processed in the second spindle-finishing apparatus, and after it is processed in the second spindle-finishing apparatus, respectively.
Figure 8B:
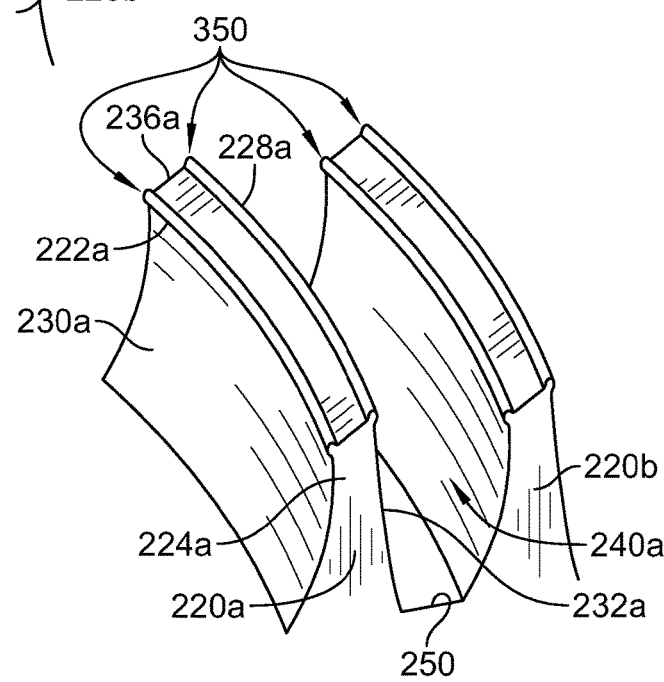
Figure 9A:
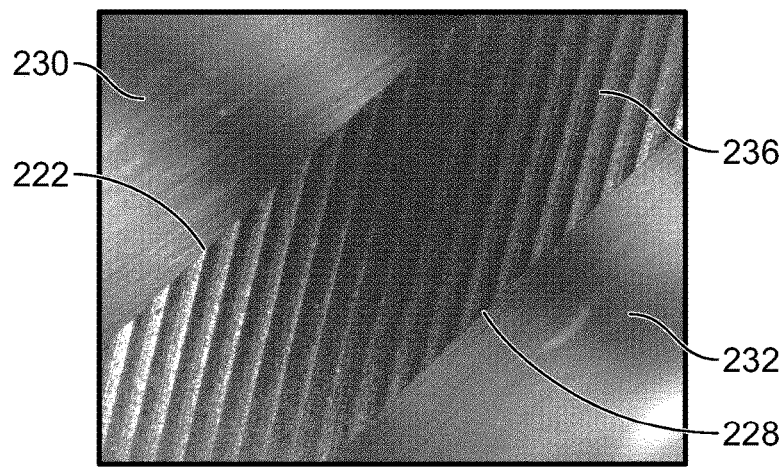
FIGS. 9A-9C are microscopic views of a single gear tooth of the workpiece of FIG. 7 before the workpiece is subjected to a first exemplary media blasting, after it is subjected to a first exemplary media blasting but before it is processed in the second spindle-finishing apparatus, and after it is processed in the second spindle-finishing apparatus, respectively.
Figure 9B:
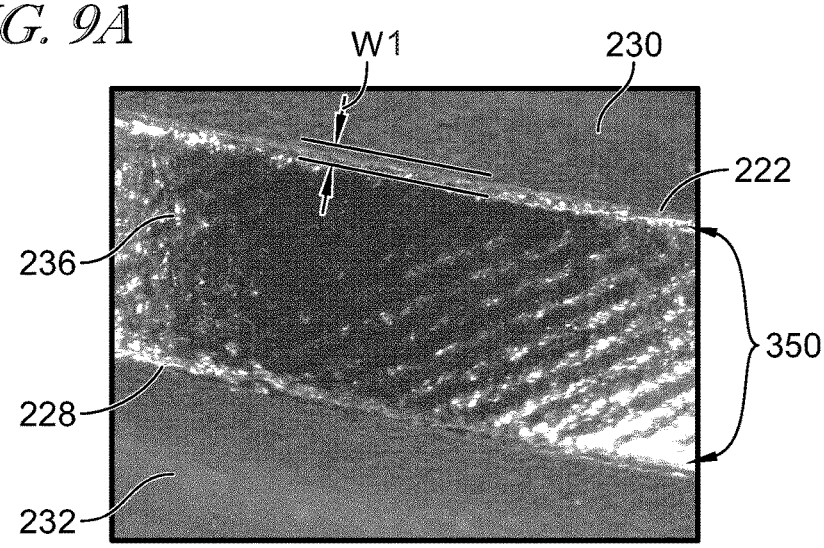
Figure 10A:
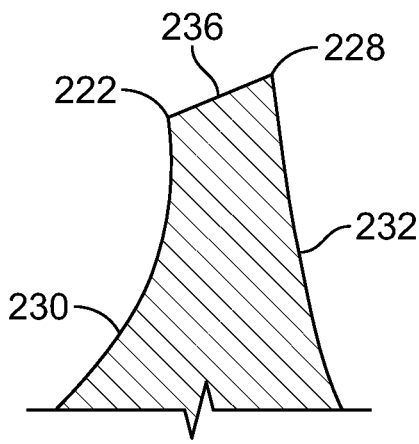
FIGS. 10A-10C are cross-sectional views of a single gear tooth of the workpiece of FIG. 7 before the workpiece is subjected to a first exemplary media blasting, after it is subjected to a first exemplary media blasting but before it is processed in the second spindle-finishing apparatus, and after it is processed in the second spindle-finishing apparatus, respectively.
Figure 10B:
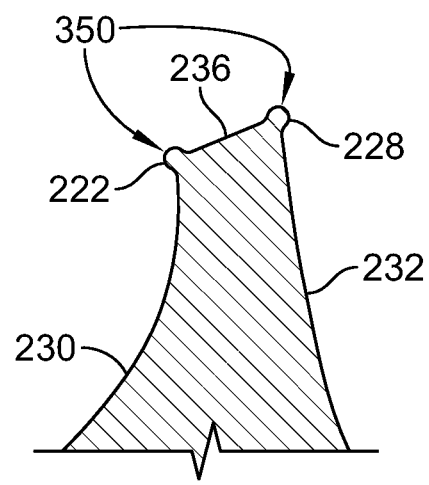

Referring now to the drawings, FIGS. 1-4 illustrate a first media blasting apparatus according to the invention, generally indicated by the number 10. FIGS. 5-6 illustrated a second finishing apparatus according to the invention, generally indicated by the number 200. FIGS. 8A, 9A and 10A illustrate a teeth-portion of a workpiece prior to the workpiece being subjected to processing in the first media blasting apparatus 10. FIGS. 8B, 9B and 10B illustrate the teeth-portion of the workpiece after processing in the first media blasting apparatus 10 but before it is subjected to processing in the second finishing apparatus 200.

Figure 2:
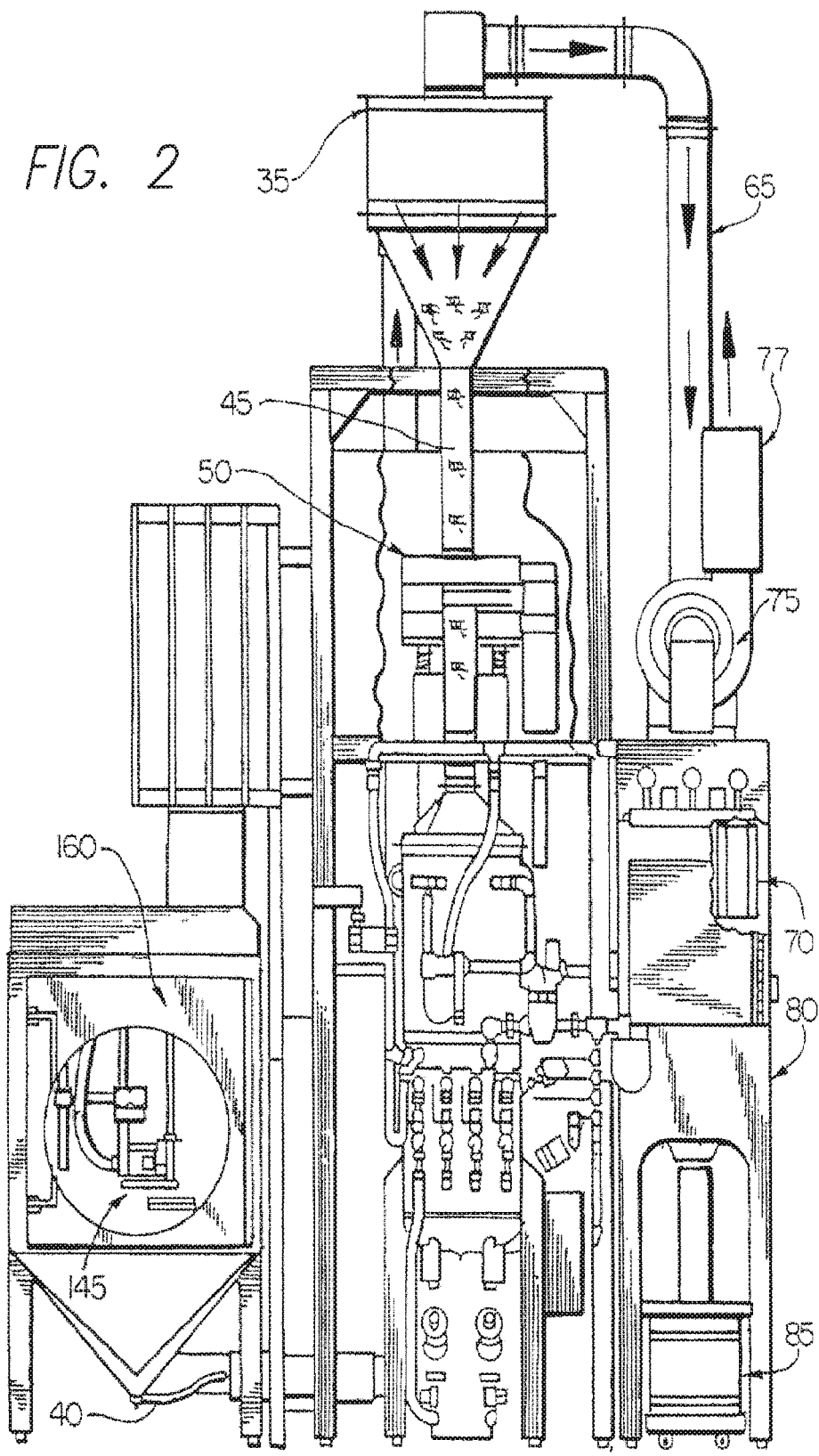
FIG. 2 is a right-side elevational view of the media blasting apparatus of FIG. 1.

The first media blasting apparatus 10 will now be described. As illustrated, the first media blasting apparatus 10 includes a blasting cabinet or chamber 15, in which a stream of media is directed against a workpiece 20. Such media may comprise, for example, cut wire, glass beads, ceramic beads or fine steel beads. The cabinet 15 is connected to a cabinet media hopper 25 for collecting the media that fall after collision with the workpiece 20. The fallen media will include broken pieces of media which have been recycled, as well as virgin or unbroken pieces. A conduit 30 connects the cabinet media hopper 25 to a media reclaim system, generally indicated by the number 35. As best illustrated in FIG. 2, the cabinet media hopper 25 is also connected to air supply means 40. The air supply means 40 provides air flow to the cabinet media hopper 25, for forcing the collected fallen media up through the conduit 30 to the media reclaim system 35.

Figure 1:
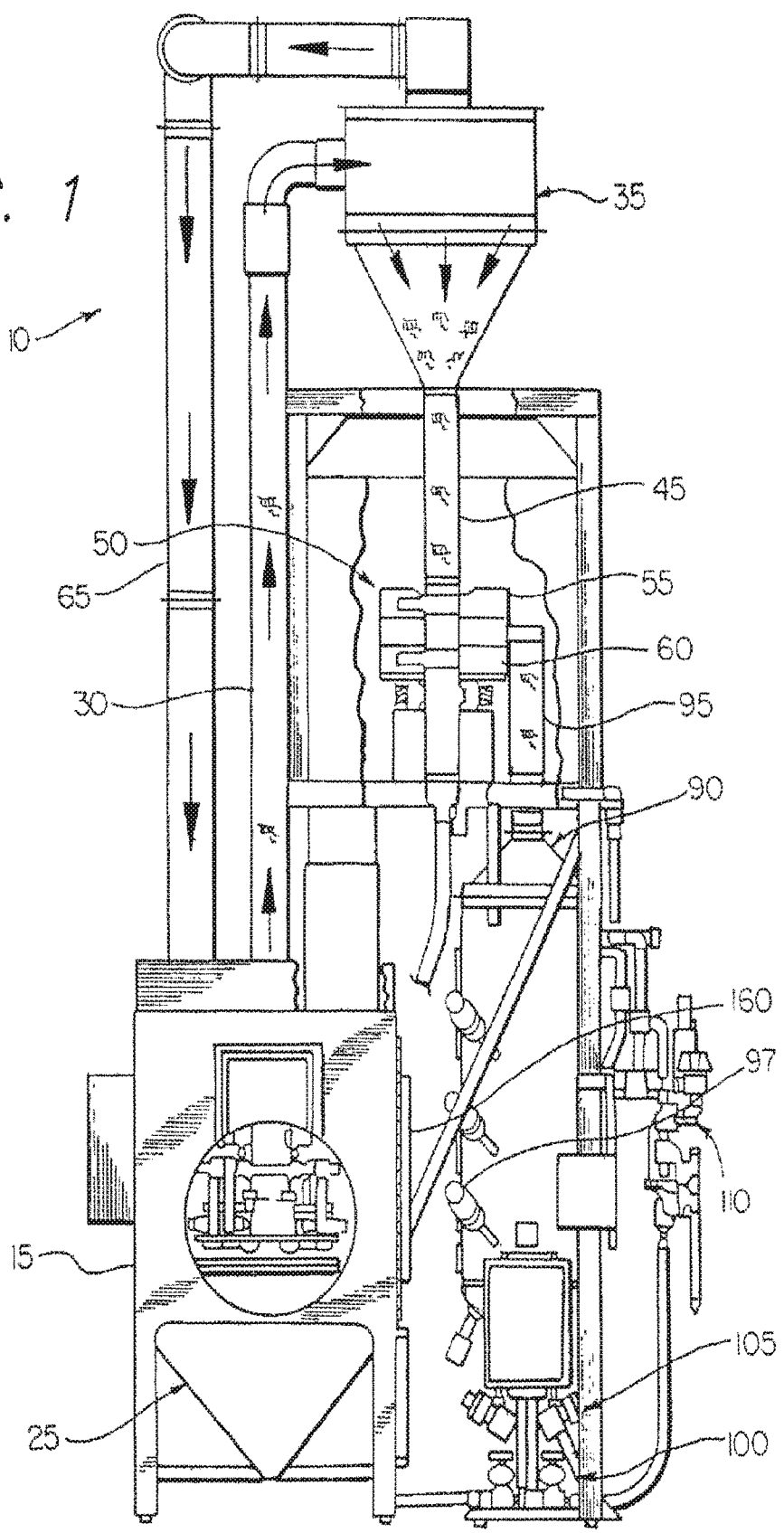
FIG. 1 is a front elevational view of an exemplary media blasting apparatus for treating a workpiece according to the first media blasting process of the invention.

As illustrated in FIGS. 1 and 2, the media reclaim system 35 includes a conduit 45 for conveying collected media to separation means 50. In illustrative embodiments, the separation means 50 may be a two-deck system comprising a top screen 55 and a bottom screen 60. In a preferred embodiment of the present invention, the top screen is between 20 and 40 mesh gauge and the bottom screen is between 170-200 mesh gauge. The separation means 50 generally separates the fallen media into unbroken media and broken media of sufficiently large size to be recycled for use in the first blasting operation and fines or dust which cannot be reused in the first media blasting apparatus 10. The separator screens 55 and 60 are constantly vibrated to increase the efficiency of separation.

As illustrated in FIG. 1, the separation means 50 of the first media blasting apparatus 10 may be connected to a double pressure chamber 90 via a conduit 95. A media path may be defined between the cabinet media hopper 25 and the pressure chamber 90. In a preferred embodiment, the double pressure chamber is held between 70 and 80 psi. The conduit 95 delivers the reclaimed reusable media to the double pressure chamber 90 where the reclaimed and reusable media are mixed with virgin media. In a preferred embodiment, the reclaimed media are of a mesh size greater than 100 mesh and the virgin media are of a mesh size between 60-100 mesh and preferably between 60-80 mesh. As stated previously, in the present invention, the media of the first medial blasting apparatus 10 may comprise glass, ceramic, or fine steel beads. The virgin media are supplied to the double pressure chamber 90 through a plurality of media supply valves 97. The double pressure chamber 90 is also coupled to a media sensor monitor 100 for automatically controlling the supply of the virgin media. The supply of the virgin media is controlled to ensure adequate peening of the workpiece. Specifically, the supply of the virgin media is controlled to ensure that adequate compression stress is provided to the workpiece 20 so that a sufficiently high fatigue strength is obtained upon blasting. The double pressure chamber 90 may further include a media metering on/off valve 105.

A further advantage of the pressurized system is that it helps ensure an adequate media velocity is obtained. As mentioned above, media velocity is an important control parameter in ensuring that sufficient compressive stress is provided to a workpiece 20. The pressurized system helps ensure an adequate media velocity through control of the media flowrate and through the positioning of the air/media mix point. The media flowrate is controlled through the media metering valve 105. The air/media mix point is located sufficiently far from the blast hose so that the media have time to develop a desired or adequate velocity before being blasted onto a workpiece.

An exemplary blasting station 120 inside the blasting cabinet 15 of the first media blasting apparatus 10 will now be described. As illustrated in FIG. 4, the workpiece 20 to be processed, i.e., blasted with media, is mounted on a part holder 125. Preferably, the part holder 125 has been hardened. In illustrative embodiments, the workpiece 20 is held in a predetermined position by a powered part hold-down apparatus 130. In the present invention, the powered part-hold-down apparatus 130 is preferably that described in U.S. Pat. No. 5,272,897, to which reference is again invited. The subject matter of U.S. Pat. No. 5,272,897 is incorporated herein by reference. The patented powered part-hold-down apparatus 130 provides variable, compensating, cushioned clamping for maintaining the workpiece 20 in the predetermined position during media blasting. The device as taught in U.S. Pat. No. 5,272,897 is very important to facilitate processing high volume quantities of parts. This is especially important for parts such as gears which tend to rotate when peened since the hold-down device prevents free spinning of the parts. The hold-down device also controllably rotates the parts at a desired rate of rotation. Rotation of the powered part-hold-down apparatus 130 is provided via a rotatable shaft 135.

In illustrative embodiments, hardened rods 140, preferably steel, provide a support system for a gun-rack assembly 145 of the blasting station 120. As illustrated in FIG. 4, the gun-rack assembly 145 holds a nozzle holder 150. A blast nozzle 155, to which the blasting hoses 115 are connected, is attached to the nozzle holder 150. The blast nozzle 155 directs a stream of media, suspended in air, against the surface of the workpiece 20. Preferably, the blast nozzle is positioned between approximately four to eight inches away from the workpiece 20. Although only one blast nozzle 155 is illustrated in FIG. 4, it will be understood to those skilled in the art that a plurality of blast nozzles 155 could be used. In a preferred embodiment of the present invention, four such blast nozzles 155 are located in the blasting cabinet 15, as shown in FIG. 3. The blasting cabinet 15, containing the part-hold-down apparatus 130 and blasting apparatus 120 is also provided with a door 160 for installation of a new workpiece 20.

Operation of the first media blasting device 10 will now be described. After a workpiece 20 is placed in the part-hold-down apparatus 130, door 160 is closed. A stream of media suspended in air is then directed against the workpiece 20 by the blast nozzle 155. As the media are blasted, the workpiece is controllably rotated by the powered patented part-hold-down apparatus 130. This controlled rotation ensures even peening of the surface of the workpiece 20 and obviates use of a high directivity stream of media, hence making the use of water-supported media unnecessary, allowing for the media to be streamed via an air-media mixture as discussed above.

The powered part-hold-down apparatus 130 is preferably rotated at between 8-12 rpm. A rate of rotation of 10-12 rpm, however, has been found to be particularly effective for treatment of gears. The rate of rotation can be related to the degree of peening required and to the evenness of dimpling on the resulting surface. A slow controlled rotation permits even peening with uniform small dimpling and prevents the media stream from striking the surface unevenly, resulting in indentations that could act as crack precursors. Thus, for example, if the workpiece 20 is a gear, the controlled rotation ensures that media, e.g. cut wire, ceramic beads, fine steel beads, or glass beads, are directed towards the root and tooth face of the gear during the course of the rotation. By ensuring even peening, the operational characteristics of the workpiece 20 are improved.

In a one embodiment a smaller mass flowrate of media is blasted at higher velocity and for a longer time than in the prior art methods. The preferred flowrate depends on the type and size of media used, as well as the particular application involved. For treatment of gears, we have found a media flowrate of approximately 1.5-3 lb/minute to be effective. Of course, other flowrates could be used, depending on the results desired. This flowrate was found to be effective with glass media, ceramic media, and fine steel media of mesh size falling in the range of 50-100 mesh. In a preferred embodiment of the present invention, however, 60-100 mesh glass media are used. When 60-100 mesh glass media were used to treat certain gears, including those made using 8620 steel or other material with a high KSI, a marked improvement in the operational characteristics of such gears was observed. The choice of media to be used depends upon the application and the relative economics. Ceramic and steel media last longer than glass; however, these media are more expensive. As with the rate or rotation, the flowrate and media used may be configured to ensure even peening of the workpiece.

The process of even peening may provide unintentional material change in the part being processed. In particular and as relevant to the present disclosure, the rate of rotation, peening media, flowrate, etc, all affect the condition of the surface of the workpiece. When processing a gear or other workpiece with teeth or other types of features that have tips, edges, or corners (e.g. sharp edges), the intensity of the peening flow against the workpiece, and in particular against the tips or edges of the workpiece, has been known to cause an unintentional mushrooming effect on the tips or edges, as illustrated for example in FIGS. 8B, 9B and 10B. This mushrooming effect causes the tips or edges to be radiused tips 350 that extend outward (e.g. from the side or top surfaces of the teeth). Such mushrooming may be considered problematic for the operation of a workpiece for a variety of reasons, including creating issues with the functionality, life-expectancy and/or noise output of the workpiece in operation.

Figure 7:
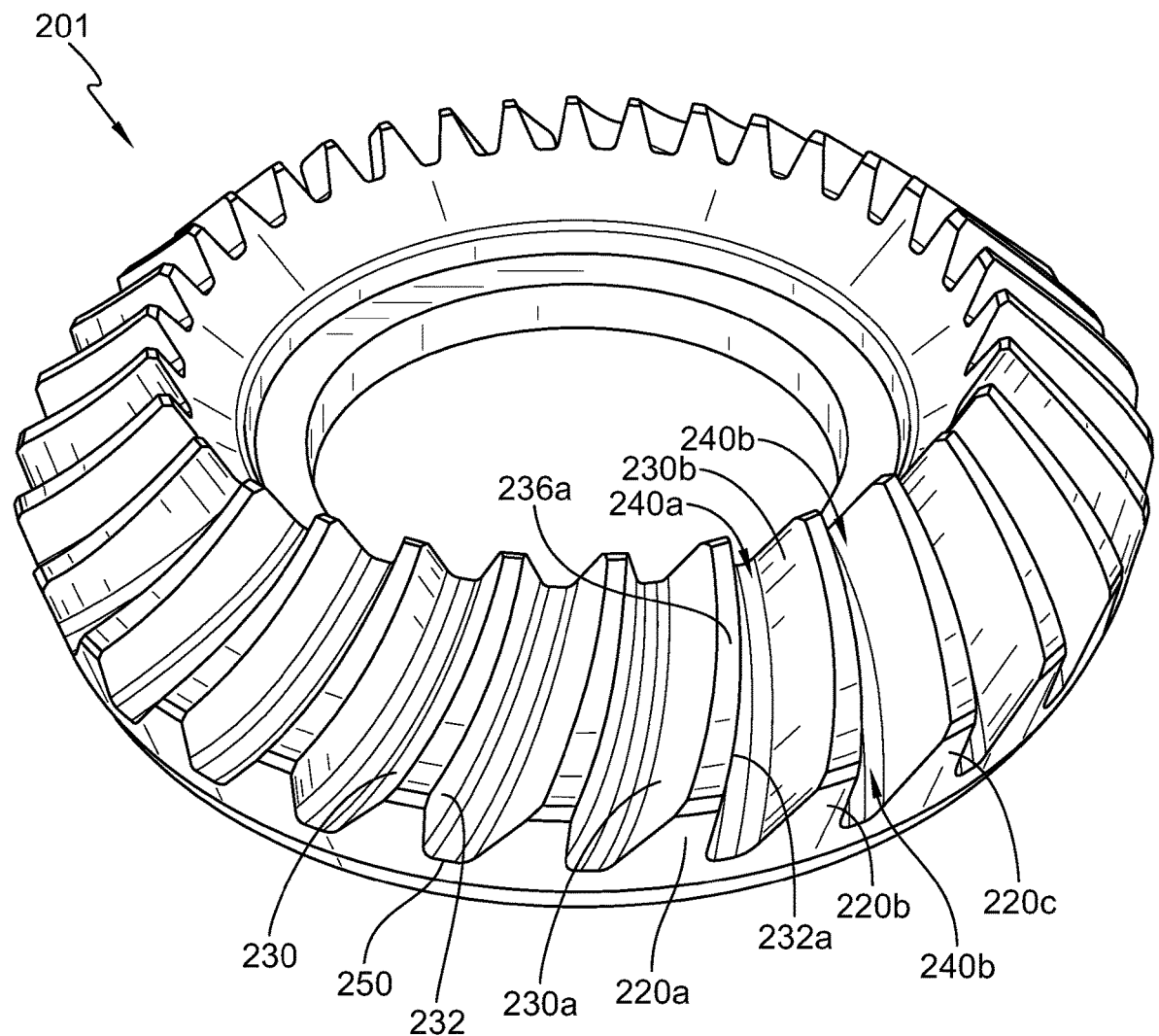
FIG. 7 is a top view of an exemplary part or workpiece that may be processed by an exemplary media blasting apparatus and an exemplary spindle-finishing apparatus.

An exemplary embodiment of a workpiece 201 with features that have tips, edges, or corners as envisioned within the scope of this disclosure will now be described, although other forms of such features with tips, edges or corners are also envisioned within the scope of this disclosure. As illustrated in FIG. 7, the workpiece 201, such as a gear or other part, includes a plurality of teeth 220a, 220b, 220c, etc with channels 240a, 240b, 240c, etc. therebetween. The teeth 220 include at least a first side surface 230 and a second side surface 232, as illustrated in FIG. 7, that extend upward from a base 250 of the workpiece 201 toward a top end 224 of the tooth 220. The second side surface 232a of a first tooth 220a is spaced apart from the first side surface 230b of a second tooth 220b to form a channel 240a therebetween. After processing, the teeth 220 are illustratively designed and configured to engage with other gears or parts (not shown) in operation, as is known in the art, by positioning the teeth 220 of one gear into the channels 240 of a second gear. In illustrative embodiments, the teeth 220 may be tapered to be wider near the base 250 of the workpiece 201 than at the top end 224. Further, in illustrative embodiments, the teeth 220 may be angled or curved in nature such that the teeth curve along the base 250, as illustrated in FIG. 7. Other variations of teeth formation are well known in the art and envisioned as applicable to the present disclosure.

Each tooth 220 includes one or more edges 222 along a top end 224 of the tooth 220. In exemplary embodiments, the tooth 220 may include a single edge 222 along the top end 224, the edge 222 defining the transition from the first side surface 230 and the second side surface 232 of the tooth 220. In other exemplary embodiments, and as illustrated n FIG. 8A, a tooth 220a may include at least a first edge 222a and a second edge 228a along the top end 224a. In illustrative embodiments, the first edge 222a and second edge 228a may be spaced apart from each other, with the edge 222a positioned between the first side surface 230a and a top surface 236a of the tooth 220a, and the edge 228a positioned between the top surface 236a and the second side surface 232a of the tooth 220a. The corresponding channel 240 of the second gear with which the tooth 220a interacts should be sized accordingly to receive the tooth 220a (e.g. if the tooth 220a includes a first edge 222a and a second edge 228a spaced apart from the first edge 222a, the corresponding channel 240 may have a larger width). As the workpiece 201 is typically cut from hardened media, such as steel, the edges 222 between the first side surface 230a/second side surface 232a and the top surface 236a may be sharp or distinct after cutting, as illustrated for example in FIGS. 8A, 9A, and 10A.

Figure 8C:
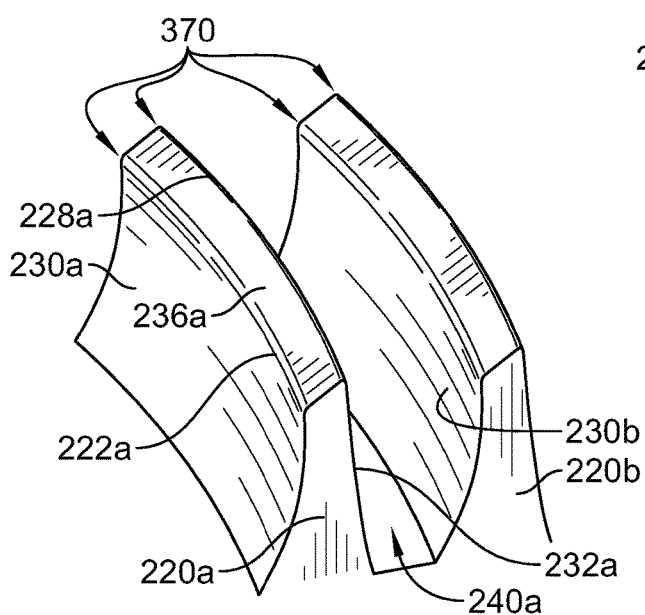
Figure 9C:
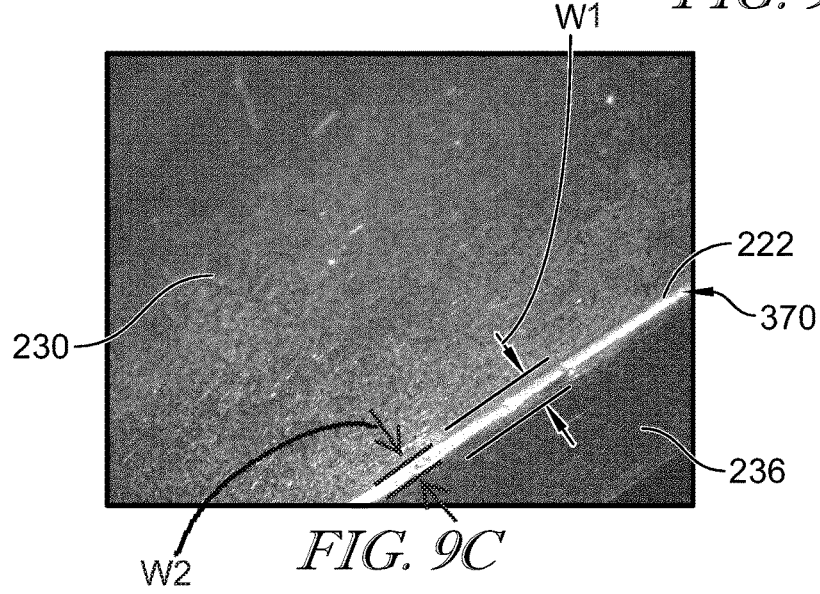
Figure 10C:
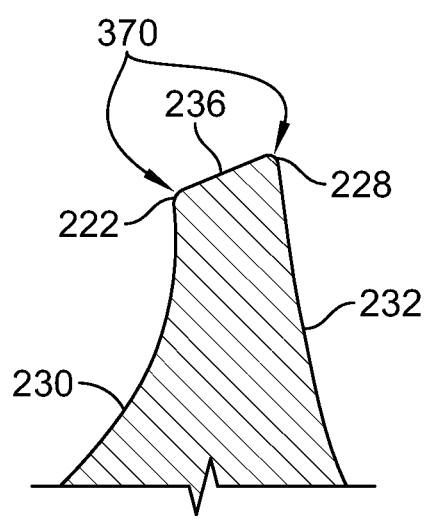

After a geared workpiece 201 is processed in the first media blasting apparatus 10, the edges 222 of the teeth 220 may have radiused tips 350, as discussed previously and as illustrated in FIGS. 8B, 9B and 10B. In order to reduce the undesired features of the radiused tips 350, further processing by the second finishing apparatus 200 is disclosed. The second finishing apparatus 200 includes further processing media that eliminates or reduces the radiused tips 350 from the edges 222 of the teeth 220, as illustrated in FIGS. 8C, 9C and 10C.

The operation of the second finishing apparatus 200 will now be described. The second finishing apparatus 200 may be, for example, a spindle apparatus or a vibe apparatus. In illustrative embodiments, the finishing apparatus 200 includes a bowl 208, a spindle unit 260 that can transfer parts into the bowl 208, and motor 282 that can rotate the bowl 208, as illustrated in FIGS. 5 and 6. After peening occurs in the first media blasting apparatus 10, the gear 201 is transferred to and secured on the spindle unit 260 of the second finishing apparatus 200. The bowl 208 contains a fine finishing medium 212 which may be a wet or dry medium, such as plastic, synthetic, ceramic or steel media. As noted with the media of the first blasting apparatus 10, the finishing media 212 may be of a variety of sizes and types and still fall within the scope of this invention. The fine finishing medium 212 is preferably a wet acidic medium or slurry, or it may be a dry medium.

The finishing apparatus 200 is depicted in FIGS. 5 and 6. In illustrative embodiments, the bowl 208 of the finishing apparatus 200 has an outlet 202, an inlet 204, sides 206, an open top 209, and a bottom 210, as illustrated in FIG. 6. The inlet 204 may be configured to permit transfer of finishing medium 212 into the bowl 208, while the outlet 202 may permit transfer of finishing medium 212 out of the bowl 208. The bowl 208 may be configured to retain the finishing medium 212 during the second finishing process. In illustrative embodiments, the bowl 208 is vibrated at a high speed frequency. The vibration of the bowl 208 of the finishing apparatus 200 may be performed via one or more vibration belts or spindles 216 coupled to and driven by the motor 282. In other illustrative embodiments, the bowl 208 is rotated to rotate the finishing medium 212. The bowl 208 may be rotated such that the finishing medium 212 moves at a high number of revolutions. For example, the bowl 208 may rotate the finishing medium at speeds up to 1000 surface feet per minute. The bowl 208 may be configured to rotate clockwise or counterclockwise. In still other embodiments, the bowl 208 may include a supplemental mixing blade 252 positioned within the bowl 208 near the bottom 210, the mixing blade 252 configured to rotate the medium 212 within the bowl 208 at a different speed than the rotation of the bowl 208. The bowl 208 is typically made of steel and may have a polyurethane liner (not shown) which can transfer the vibrations or rotations of the bowl 208 to the medium 212.

In illustrative embodiments, the centrifugal force created within the bowl 208 during rotation may spin the selected finishing medium 212 into a form-fitting grinding wheel (not shown). In other embodiments, if the bowl 208 and/or medium 212 within the bowl 208 is rotated at a slower rotation speed, the slurry of finishing medium 212 may remain dispersed throughout the bowl 208. As an example, it may be beneficial to rotate the bowl 208 at a slower speed in order to assure uniform deburring and finishing of all surfaces of a workpiece.

In illustrative embodiments, the second finishing apparatus 200 includes two or more spindles 260a, 260b, etc., as depicted in FIG. 6. In various embodiments, each spindle 260 may process a single part or a cluster of small parts depending on the design of the spindle 260. The spindle 260 include a head 262 onto which the workpiece 201 may be securely coupled or connected. The spindle 260 may further include a connection arm 264 to which the head 262 is coupled, the connection arm 264 being permitted to pivot and rotation upon direction of a computer or other electronic system (not shown) accordingly to the requirements of operation or input from an operator of the finishing apparatus 200. In illustrative embodiments, the head 262 may also be configured to rotate or pivot with respect to the connection arm 264. Alternatively, the head 262 may be connected to an extension arm 266 that rotates with respect to the connection arm 264, as indicated by the path of rotation 270 as illustrated in FIGS. 5 and 6. The extension arm 266 and/or head 262 may be configured to rotate clockwise or counterclockwise. The entire spindle 260 may work together to position the part 201 coupled to the head 262 within the slurry of finishing medium 212, as illustrated in FIG. 6.

In illustrative embodiments, prior to operation of the finishing apparatus 200, finishing medium 212 may be pumped into the bowl 208 via a connection line 254 that is coupled to the inlet 204. Similarly, a connection line 256 may extend from the outlet 202 of the bowl 208 to permit drainage of the finishing medium 212 when the finishing apparatus 200 is not in use or the finishing medium 212 is replaced. The finishing apparatus 200 may include an overflow tank 258 to receive and store finishing medium 212, the overflow tank being connected to the connection lines 254 and 256. In illustrative embodiments, a pump 268 may be positioned within the overflow tank 258 or along the connection line 254 to pump the finishing materials 212 into the bowl 208.

In illustrative embodiments, the finishing medium 212 may be a wet acidic fine finishing medium that is sufficient to wet the gears 201 and ceramic media 212. In other embodiments, the finishing medium may be dry. The relative size of the gear 201 and media 212 may vary depending on the type of gear, media, and desired finished product. The relative size of the media 212 and gears 201 is such that the media 212 is small enough to fit into the space between the gear teeth 220 so that during fine finishing (vibration/rotation), the edges 222 and 228 of the teeth are subjected to the finishing process. One example of a fine finishing medium 212 comprises a mixture of ceramic media with a slightly acidic solution. Such finishing may be continued to reduce or remove the radiused tips 350 of the gear teeth 220.

In illustrative embodiments, the finisher apparatus 200 may be used to finish the side surfaces of the gear, including the surfaces of the gear teeth 230 and 232, in addition to the edges 222 and 228.

In a preferred embodiment a gear is coupled to the spindle 260, and the edges and surfaces of the gear that are desired to be fine-finished are submerged into the finishing media 212. The head 262 or extension arm 266 of the spindle 260 rotates the gear or part 201, while the spindle 260 holds the gear 201 in a stationary position relatively to the rest of the bowl 208. In illustrative embodiments, the bowl 208 may also vibrate and rotate as discussed previously. The rotation and/vibration of the head 262, extension arm 266, and/or bowl 208 is continued for a time sufficient to reduce the radius of the tips or edges, as discussed herein.

During rotation and/or vibration (fine finishing), additional water and/or fine finishing medium may be added via one or more inlets 204. Excess fine finishing medium, water etc, may be removed via outlet 202. In illustrative embodiments, fine finishing may be continued to smooth the gear (workpiece) surfaces in addition to reducing or removing the radiused tips 350 of the gear teeth 220. Such finishing may also provide small indentations on the other surfaces of the gear, which may improve compressive stress and oil retention features of the gear.

After sufficient processing in the second finishing apparatus 200, the radiused tips 350 of the teeth 220 of the gear 201 may be substantially lower in profile, as shown at 370, as illustrated in FIGS. 8C, 9C and 10C, or be removed altogether. For example, in illustrative embodiments, the radiused tips 350 of the teeth 220 prior to the second finishing process may be a certain width W1 across, as shown in FIG. 9B. After the second finishing process, the radiused tips 370 may have a smaller width W2 than the width W1 of the radiused tips 350 prior to the second finishing process, as illustrated in FIG. 9C.

After fine finishing the gear is removed from the bowl, washed, and rinsed. The gear may be further treated with rust inhibitor in a final step whereby a gear with enhanced wear properties is provided.

In illustrative embodiments, the gear may be transported from the first media blasting apparatus 10 to the second finishing apparatus 200 via any known conventional transportation means. In an exemplary embodiment, the transportation means may be fully automated without user input. For example, the transportation means may include a removal apparatus 380 that removes the part 201 from the part-hold-down apparatus 130 of the media blasting apparatus 10, as illustrated in FIG. 5. The removal apparatus may include an electronically controlled hand 382 that can grasp and retain the part 201, as well as a pivotable and/or rotatable arm 384 that can rotate the part to engage with the head 262 of the spindle 260 to connect the part 201 to the head 262. In other embodiments, the rotatable arm 384 may rotate the hand 382 holding the part 201 to a movable track or conveyor system 386 which conveys the part 201 to a location where the spindle 260 may rotate or pivot to pick up the part 201, as illustrated in FIG. 5. Other methods of automatic transportation are known in the art.

In another embodiment the gears are fine finished in a bowl without the addition of liquid medium (i.e., with dry fine finishing medium). In this embodiment the gears are in effect fine finished while dry and in the presence of wear material that smoothes the gear surface, but wherein the wear material is not in liquid form. Coupling vibrations and/or rotations to the container to vibrate the fine finishing medium with the gear reduces the size of indentations on the surfaces of the gear during the second finishing process, leaving compressive stress and oil retention advantages remaining on the gear surface. The edges of the teeth resulting after finishing has smoothness and the radiused tips 350 are reduced, as discussed above, with the surface of the teeth, and in particular the edges of the teeth, having indentations resulting from peening and reduced by but remaining after finishing.

For gears treated by the above-discussed preferred two-step process of media blasting followed by fine finishing, tests confirm that gears so treated exhibit superior performance relative to gears not treated with this process. It has been found that gears treated with this preferred process exhibit reduced noise-generation when the gears are used in operation. Other advantages may be found as well, including superior fatigue strength and less failure of gears to operate properly due to a misconnection between gear teeth from the mushrooming effect.

While the method of media blasting and finishing for gears is disclosed herein with respect to a hold down apparatus, it is contemplated that other conventional part holders and blasting apparatus may also be used with the steps described herein. The above discussed process recognizes that most often gears need steel peening at the gear root to prevent fatigue bending in the root radius.

The applicant has provided description and figures which are intended as an illustration of certain embodiments of the invention, and are not intended to be construed as containing or implying limitation of the invention to those embodiments. It will be appreciated that, although applicant has described various aspects of the invention with respect to specific embodiments, various alternatives and modifications will be apparent from the present disclosure which are within the spirit and scope of the present invention as set forth in the following claims.

I claim:

1. An apparatus for processing a workpiece having one or more defined edges, the one or more defined edges having a cross-sectional shape that includes at least one tip, the apparatus comprising:
    a media blasting apparatus configured to subject the workpiece to a media blasting process with a first media and forming the tip of the one or more defined edges into a radiused tip having a first width; and
    a finishing apparatus configured to subject the workpiece to a finishing process after the media blasting process, wherein the finishing apparatus includes a finishing container in which a second media is contained, at least one of a vibration belt or vibration spindle configured to vibrate the finishing container, and a spindle apparatus configured to hold the workpiece in a fixed position within the container as the finishing container rotates and vibrates.

2. The apparatus of claim 1, wherein the workpiece comprises one or more teeth, and wherein the one or more defined edges are located on a tip of the one or more teeth.

3. The apparatus of claim 2, wherein the workpiece is a gear.

4. The apparatus of claim 1, wherein the media blasting process is a peening process.

5. The apparatus of claim 4, wherein the peening process directs a stream of the first media suspended in air toward the workpiece, the workpiece being rotated at a constant rate during processing.

6. The apparatus of claim 1, wherein the first media comprises cut wire, ceramic beads, fine steel beads, or glass beads.

7. The apparatus of claim 6, wherein a second media is a slurry.

8. The apparatus of claim 6, wherein the apparatus further comprises a transportation apparatus configured to transport the workpiece from the media blasting apparatus to the finishing apparatus on an automated conveyor system.

9. The apparatus of claim 6, wherein the radiused tip has a mushroomed shape as compared to the shape of the tip before the media blasting.

10. The apparatus of claim 1, wherein a second media comprises metal, plastic, glass, or ceramic.

11. The apparatus of claim 1, wherein the finishing container comprises a processing bowl.

12. The apparatus of claim 11, wherein the spindle apparatus rotates the workpiece within the processing bowl.

13. The apparatus of claim 11, wherein the processing bowl rotates a second media when the workpiece is retained within the processing bowl.

14. The apparatus of claim 11, wherein the bowl includes at least one fin to rotate a second media within the processing bowl.

15. The apparatus of claim 11, wherein the finishing apparatus includes a second spindle apparatus to retain a second workpiece within the processing bowl.

16. The apparatus of claim 11, wherein the spindle apparatus permits rotation of a gear relative to the processing bowl.

17. A method for processing a workpiece having one or more defined edges, the one or more defined edges having a cross-sectional shape that includes at least one tip, the method comprising:
- blasting the workpiece with a first media and forming the tip of the one or more defined edges into a radiused tip having a first width; and
- subjecting the workpiece to a finishing process after blasting the workpiece with the first media, wherein the finishing process includes:
    - adding the workpiece to a finishing container of a second media that is rotating;
    - holding the workpiece in a fixed position as the finishing container rotates; and
    - vibrating the second media to wear down the radiused tip such that the width of the radiused tip becomes a second width, wherein the second width is less than the first width.

\* \* \* \* \*